M. POPELKA.
CREAM CAN.
APPLICATION FILED JULY 19, 1919.

1,372,827.

Patented Mar. 29, 1921.

WITNESSES
Guy M. Spring
J. B. Hillyard

Inventor
MARY POPELKA
By Richard B. Owen
Attorney

UNITED STATES PATENT OFFICE.

MARY POPELKA, OF BREED, WISCONSIN.

CREAM-CAN.

1,372,827.                    Specification of Letters Patent.    Patented Mar. 29, 1921.

Application filed July 19, 1919. Serial No. 312,023.

*To all whom it may concern:*

Be it known that I, MARY POPELKA, a citizen of the United States, residing at Breed, in the county of Oconto and State of Wisconsin, have invented certain new and useful Improvements in Cream-Cans, of which the following is a specification.

The invention has for its object to provide a can particularly adapted for the collecting of cream, and which while admitting of thorough ventilation prevents entrance of dust, insects or foreign matter into the can to the possible detriment of the milk contained therein.

The invention provides a can having a removable cover, in which is formed an opening protected by wire gauze, or like material and having upper and lower protectors spaced from the cover and supplementing the action of the wire gauze in keeping the contents of the cans free and clean of foreign matter of any nature.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

The accompanying drawing illustrates an embodiment of the invention and on reference thereto:

Corresponding and like parts are referred to in the following description and indicated in the several views of the drawing by like reference characters.

Figure 1:
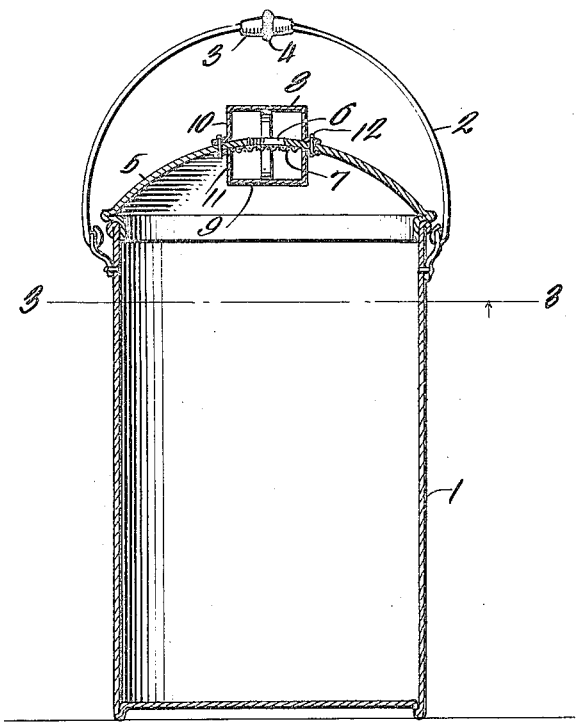
Figure 1 shows a vertical central section of a milk can, illustrating the application of the invention.
Figure 2:
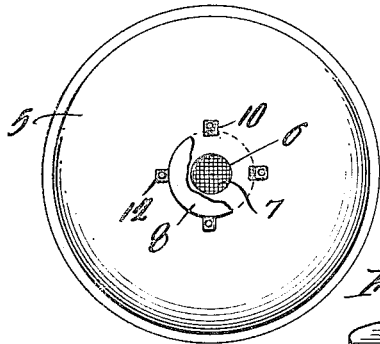
Fig. 2 is a top plan view of the cover, a portion of the upper guard plate being broken away.
Figure 3:
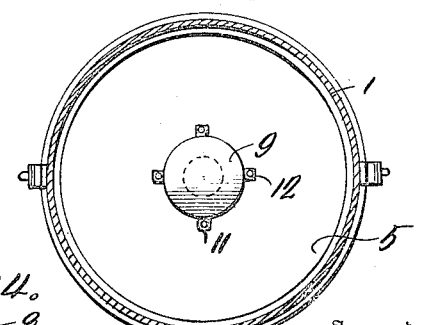
Fig. 3 is a horizontal section on the line 3—3 of Fig. 1 looking upward, as indicated by the arrow.
Figure 4:
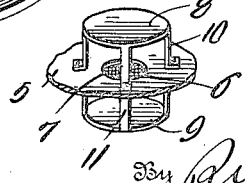
Fig. 4 is a detail perspective view of the central portion of the cover provided with the protected ventilating opening.

The can 1 may be of any construction and capacity and is provided with a handle 2 and a grip 3, the latter being provided with a centrally disposed ring 4 of rubber or other material which constitutes a buffer to prevent the sides of the can being marred in the event of the handle striking the same.

A cover 5 closes the top of the can 1 and is raised or dome shaped. An opening 6 is formed in the center of the cover 5 and is covered by wire gauze 7, or like material, which extends across the opening 6 and is attached to the underside of the cover beyond the edges of the opening. The opening 6 provides for the escape of gases and warm air and admits of cool fresh air passing into the can for aerating the milk, if necessary. The wire gauze 7, or like material prevents insects from entering the can through the opening 6 and also excludes the entrance of any foreign matter into the can to render the milk unsanitary or cause deterioration thereof. Guard plates 8 and 9 are disposed above and below the cover 5 in line with the opening 6. These guard plates are larger than the opening 6 so as to project beyond the edges thereof. Suitable supports 10 and 11 are attached to the cover 5 and sustain the respective guard plates in proper position. The supports preferably form a part of the respective guard plates and consist of strips which extend at a right angles to the guard plates and have the ends attached to the cover, bent outwardly and apertured to receive suitable fastenings 12 which pass through openings in the cover and openings formed in the bent ends of the supports.

To use a milk can embodying the invention, the cover is removed therefrom and the milk to be set aside is placed in the can. The cover is now replaced and the can set aside for collection of the cream. The protected opening 6 provides for a thorough ventilation and the several protectors prevent the passage of foreign matter into the can through the opening 6. The top plate 8 collects any dust or other matter tending to pass downward through the opening 6 and the plate 9 serves to catch any dust or small particles that may find their way through the wire gauze 7. At a result, the milk and cream are kept free from foreign matter while at the same time provision is had for ample ventilation.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A milk can provided with a cover having a screened opening in the top thereof, and guard plates attached to the cover above and below the opening and of larger diameter than the latter, said plates supplementing the action of the screened opening in keeping the contents of the can free from foreign matter while contained in the can.

2. A milk can having a dome-shaped cover provided with a centrally disposed opening in the top thereof, a gauze covering for the opening, guard-plates respectively arranged interiorly and exteriorly of the cover, and disposed in line with the opening, supporting means forming a part of the respective guard-plates and connecting them to the cover above and below the opening therein, and fastenings passing through the cover and the supporting means of the guard-plates whereby the latter are held in slightly spaced relation to the said opening.

In testimony whereof I affix my signature in presence of two witnesses.

MARY POPELKA.

Witnesses:
O. H. ZAHN,
PAUL STUCKHE.